(12) United States Patent
Machuszek (10) Patent No.: US 12,103,452 B2
(45) Date of Patent: Oct. 1, 2024

(54) MULTI-PURPOSE ORGANIZING TRAY

(71) Applicant: Mark Machuszek, Manhattan Beach, CA (US)

(72) Inventor: Mark Machuszek, Manhattan Beach, CA (US)

(*) Notice: Subject to any disclaimer, the term of this patent is extended or adjusted under 35 U.S.C. 154(b) by 1004 days.

(21) Appl. No.: 17/086,750

(22) Filed: Nov. 2, 2020

(65) Prior Publication Data

US 2022/0134929 A1 May 5, 2022
US 2023/0001836 A2 Jan. 5, 2023

Related U.S. Application Data

(60) Provisional application No. 62/933,026, filed on Nov. 8, 2019.

(51) Int. Cl.
*B60N 3/00* (2006.01)

(52) U.S. Cl.
CPC ................... *B60N 3/005* (2013.01)

(58) Field of Classification Search
CPC ........... A47B 23/002; A47B 5/02; A47B 5/04; A47B 9/12; B60N 3/005; B60R 11/0252; B60R 2011/001; B60R 2011/0015; B60R 2011/0017; B60R 2011/0059; B60R 2011/0077; B60R 2011/0082
USPC ........................................................ 224/276
See application file for complete search history.

(56) References Cited

U.S. PATENT DOCUMENTS

| | | | |
|---|---|---|---|
| 5,060,581 A * | 10/1991 | Malinski | B60N 3/005 248/441.1 |
| 5,385,283 A * | 1/1995 | Shioda | B60N 3/005 224/276 |
| 5,558,026 A * | 9/1996 | Seibert | B60N 3/005 224/276 |
| 6,270,049 B1 * | 8/2001 | Olvey | A47B 96/202 248/447 |
| D725,013 S | 3/2015 | Salinas | |

(Continued)

FOREIGN PATENT DOCUMENTS

| | | | | |
|---|---|---|---|---|
| DE | 3701593 A1 * | 8/1988 | | |
| FR | 2854777 A1 * | 11/2004 | | A45C 9/00 |

OTHER PUBLICATIONS

FR 2854777 A1 Translation, Le Gal C, Nov. 19, 2004 (Year: 2004).*
DE 3701593 A1 Translation, Berg, Aug. 4, 1988 (Year: 1988).*

*Primary Examiner* — Nathan J Newhouse
*Assistant Examiner* — Matthew T Theis
(74) *Attorney, Agent, or Firm* — Metropolis IP Group, LLC; Eric Kang (57) ABSTRACT

A tray assembly adapted for mounting on the top portion of a steering wheel comprising a foldable, backboard having one or more rigid panels wherein the sole or top-most panel of said backboard incorporates a steering wheel attachment, one or more rigid shelf panels, said steering wheel attachment is made of an elastic material connected to the top portion said backboard to form a securement pouch that slides on or over and fully conforms to the shape of said steering wheel. An alternative tray assembly embodiment comprising three rigid panels wherein an upper level panel closest to the 12 o'clock position of the steering wheel is connected at its lower edge to the top edge of a substantially vertical panel, said vertical panel connected at its lower edge to the top edge of a lower level panel closest to the 6 o'clock position of said steering wheel.

9 Claims, 11 Drawing Sheets

(56) References Cited

U.S. PATENT DOCUMENTS

| | | | |
|---|---|---|---|
| 2006/0175520 A1* | 8/2006 | Cooper | B60N 3/005 |
| | | | 248/444 |
| 2008/0029675 A1* | 2/2008 | Thorwaldson | B43L 3/008 |
| | | | 248/339 |
| 2008/0257228 A1* | 10/2008 | Chisler | B60N 3/005 |
| | | | 108/44 |
| 2018/0304792 A1 | 10/2018 | Syrianos | |
| 2019/0118724 A1* | 4/2019 | Garner | B60R 11/00 |

* cited by examiner

MULTI-PURPOSE ORGANIZING TRAY

CROSS-REFERENCE TO RELATED APPLICATIONS

The present application claims priority to provisional patent application No. 62/933,026 filed on Nov. 8, 2019, disclosures of which are incorporated herein at least by reference.

BACKGROUND OF THE INVENTION

1. Field of the Invention

The invention relates generally to trays, and more particularly to a tray adapted for mounting upon a steering wheel of a motor vehicle.

2. Discussion of the State of the Art

When a motor vehicle is not transporting occupants, it is often used by the occupants as a comfortable and secure setting to do tasks like eating, using an electronic device, reading, relaxing, applying cosmetic make-up, and more. Oftentimes, these tasks are facilitated with large, level surfaces where objects can be placed, such as an electronic device, food, beverage containers, eyeglasses, books, make-up, and more. Other than cupholders, a motor vehicle from the driver's seat lacks adequate provisions to hold many of these items safely and securely. Center consoles are off to the side and the area of a flat, level surface is generally too small for many items.

To address this issue at the driver seat, several tray-like products have been patented and/or are sold in the marketplace. However, all such existing products are too bulky or heavy, and/or too complicated to use, and/or too time consuming and involved to install/uninstall (especially those requiring tools to tighten or loosen clamps), and/or are too impractical/difficult to store, and/or not universally compatible enough, and/or mounted too low or too high.

For example, Syrianos [U.S. Utility Pat. Pub. No. 2018/0304792 A1] teaches a tray with an elongated aperture that the steering wheel is allowed to pass through until the aperture is totally occupied by the steering wheel in some sort of interference fit or when the aperture end of the tray is able to rest on the protruding steering wheel hub below it. The issues with this design are numerous. The relative dimension of the steering wheel and aperture determine the placed height of the tray, necessitating different aperture dimensions for different steering wheel dimensions. Due to these geometric constraints, the top surface of the tray would be too high to conveniently type or write. Another is the cantilevered design requires both sturdy materials and substantial tray thickness to remain rigid for forces applied near the opposite edge of the aperture. Unfortunately, such a tray would be too heavy and cumbersome for many to handle. This tray is also not foldable, which complicates storage.

Salinas [U.S. Design Pat. No. U.S. D725,013 S] shows another type of tray with a tongue-like structure passing through the lower cutout of a steering wheel. The design is mounted low enough such that the tray would interfere with the thigh and lower torso of the occupant in the driver's seat. The design also appears to be non-foldable, which complicates storage.

Malinski [U.S. Utility Pat. No. 5,060,581] addresses some of the aforementioned concerns with a foldable steering wheel mounted tray mounted in a more vertically central (i.e., not too high nor too low). The tray is secured to the steering wheel by a restraining strap anchored on each extent at a pair of slits at the distal ends of the panel that is substantially along the same plane as the circular plane of the steering wheel. The tray and restraining strap form a loop that during tray placement, is slipped over the top of the steering wheel and the tray is pulled "downwardly until the loop is taut" or "where the maximum extent of the loop between the right and left sides equals the length of the cord formed between the two portions of the periphery of the steering wheel." Unfortunately, this creates a fault scenario if the steering wheel diameter is too small (sports car steering wheels can be relatively small) relative to the surrounding loop to enable this restraining condition. General applicability within one strap dimension is therefore limited. Furthermore, the inclination of the tray is adjusted by changing the length of the straps between the slits of the adjoining panels, but this length is defined by a tension constraint (strap pull stop) formed by using brads to bunch the strap ends that pass through the respective slits. This is more hassle and complicated than the approach used by the present invention.

Siebert [U.S. Utility Pat. No. 5,558,026] addresses Malinski's tray securement issue by creating a rigid "pocket" geometry that allows the tray to be hung on the steering wheel top. However, the back panel of the pocket in the disclosed figure appears to fit around the steering wheel spoke, which appears necessary to prevent the "body" panel from lifting off the hub of the steering wheel. However, the problem here is the steering wheel needs to be turned prior to securement such that one steering wheel spoke is vertical as seen by the driver. Furthermore, steering wheel spoke geometry varies from vehicle to vehicle, which in turn creates another issue of general applicability, because the angle between pocket opening angle may not coincide with the angle formed between the steering wheel plane and steering wheel spoke. The rigid nature of the panels forming the pocket also makes it less universal in that it would not conform to a variety of geometries like an elastic type pouch.

Another limitation is all cited patents, publications, and marketplace offerings disclose just a single tray. Finally, none of the cited patents, publications, and marketplace disclose a tray embodiment that works with steering wheels whose circular plane is substantially horizontal or substantially parallel to the vehicle floorboard, like those seen in buses, commercial heavy-duty trucks, and vehicles where the driver is over or ahead of the steered tires.

SUMMARY OF THE INVENTION

The present disclosure resolves all the previously mentioned issues and offers other utilities with a novel, lightweight, simple-to-use, trivial to install and uninstall, versatile, and "one-size-fits-all" steering wheel tray assembly. This disclosure describes two tray assembly embodiments. One tray assembly embodiment applies for a steering wheel whose circular plane is substantially vertical or whose steering column axis is less to substantially less than approximately 60° relative to the vehicle's floorboard. An alternative tray assembly embodiment is designed to work with steering wheels whose circular plane is substantially horizontal or is less to substantially less than approximately 60° relative to the vehicle's floorboard to the vehicle's floorboard.

One or more of the disclosed embodiments boasts a multitude of features that is not even remotely offered by the current state-of-the-art. It begins with simple and universal fit mounting of the tray assembly, where the backing of one of the panels of one embodiment has a stretchable securement pouch that slips around the top arch of most late-model steering wheels for a snug friction fit. All embodiments can have more than one adjustable tray surfaces instead of one relatively long tray surface that extends too close or into the occupant's body. One or more occupant panels in view of the user when mounted on the steering wheel can be a whiteboard, where notes can be written and erased. The unique two-hinge architecture of one of the embodiments allows the tray assembly to function as a stand for thin electronic devices like tablets or smartphones.

The relatively flat form factor when the tray is folded (range between approximately ¾ inches to 1.5 inches depending upon the number of shelves and baseboard material used) lends itself to several other uses beyond its core function. For example, the folded thickness of the tray allows this tray when full folded to fill gaps between the front seat and center console or door and effectively block small items from falling through the gap occupied by the tray. An optional bib can be attached to both the tray and user and be folded away conveniently with the tray after use. The tray's folded dimension and light weight enable it to be potentially used as a sun visor extension. When the tray is fully folded, the pouch doubles as a holder of small articles like books and pens. A fully or partially folded tray can also be placed on the user's lap to be used as a "lap tray."

BRIEF DESCRIPTION OF THE DRAWING FIGURES

The drawings are provided to facilitate understanding in the detailed description. It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION

PRIMARY COMPONENTS: The following comprises the primary components of the present invention.

1. Plastic, corrugated plastic, acrylic, plywood, or composite board
2. Vinyl and/or white board sheets, paint, or stain
3. Elastic material, cloth, nylon fabric, netting, or elastic straps
4. Book tape, tape, plastic, rubber, vinyl tape, piano hinges, or accordion hinges
5. Cord, straps, or metal/plastic straps
6. Self-sticking VELCRO® brand fastener or clips
7. Glue, staples, thread, plastic weld, or rivets Tray1 (200) refers to a tray assembly embodiment that is attachable to substantially vertical steering wheels (102) or steering wheels (102) whose steering column axis (101) is less to substantially less than 60° relative to the vehicle's floorboard. Tray2 (300) refers to a tray assembly embodiment that is attachable to steering wheels (103) whose circular plane is substantially horizontal or is less to substantially less than 60° relative to the vehicle's floorboard.

For the present disclosure, the tray's panel surfaces (201, 204, 205, 208, 301, 303, 305) notated by a single quotation (') represents the side of the panel that is on the opposite side of the surface notated with a double quotation ("). Without any notation, these panels (201, 204, 205, 208, 301, 303, 305) signify the entire panel without consideration of a particular side. For referencing VELCRO® brand fasteners, the "hook" portion has no post-index notation (i.e., 209) while the "loop" side has a single quotation (i.e., 209').

The dimensions, shape, and nature of construction described below represent those that have been proven to work in prototype testing. However, it must be understood that the illustrated embodiments have been set forth only for the purposes of example and that it should not be taken as limiting the embodiment.

CONSTRUCTION OF TRAY1 (Reference FIGS. 1-8): Plastic, wood, acrylic or composite board can be substituted for each other depending upon availability, weight, use, safety, and sanitation requirements. These parts form the structure of the tray assembly unit (201, 204, 205, optionally 208). The rigid panels (201, 204, 205, optionally 208) are generally cut in 7×15 inch rectangles with at least two panels needed to make a single shelf model. The top-most panel (201) may also be curved to conform to the shape of the steering wheel (102), but some potential space is lost for other uses, such as a whiteboard to be described later. These dimensions can be changed depending upon use or style. Additional panels can be added to make a bigger, multi-shelf device by simply repeating the attachment methods. In the illustrated two-shelf tray1 embodiment (FIGS. 1-8), the panels (201, 204) form the backboard structure that lays against the steering wheel (102). From FIGS. 2-4, the illustrated bottom edge of said top-most panel (201) connects to the top edge of panel (204) in a manner to be described later when describing panel hinges. An alternative to this configuration would be to have a one-piece non-folding backboard (not shown) approximately the size of the steering wheel (102); however, this alternative embodiment cannot collapse to a smaller footprint and would be more difficult to stow.

Figure 1:
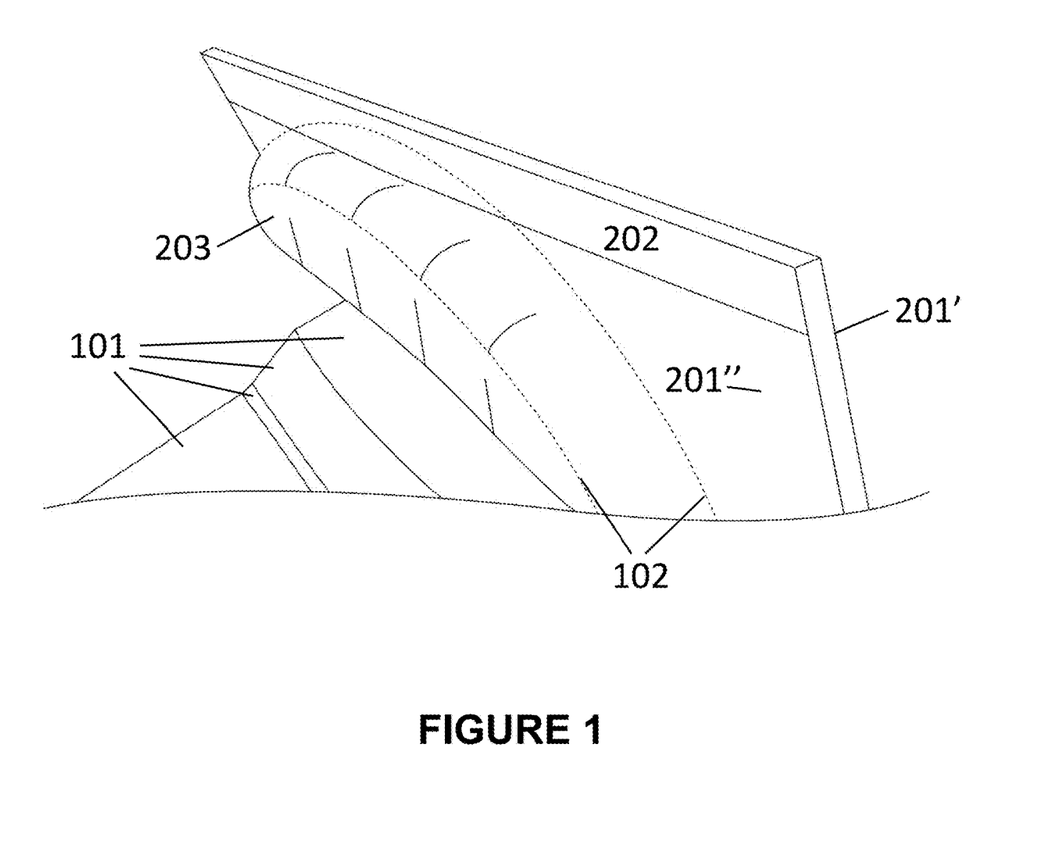
FIG. 1 is close-up view of one embodiment for substantially vertical steering wheels (tray1) and its universal fit securement pouch slipped onto a steering wheel
Figure 2:
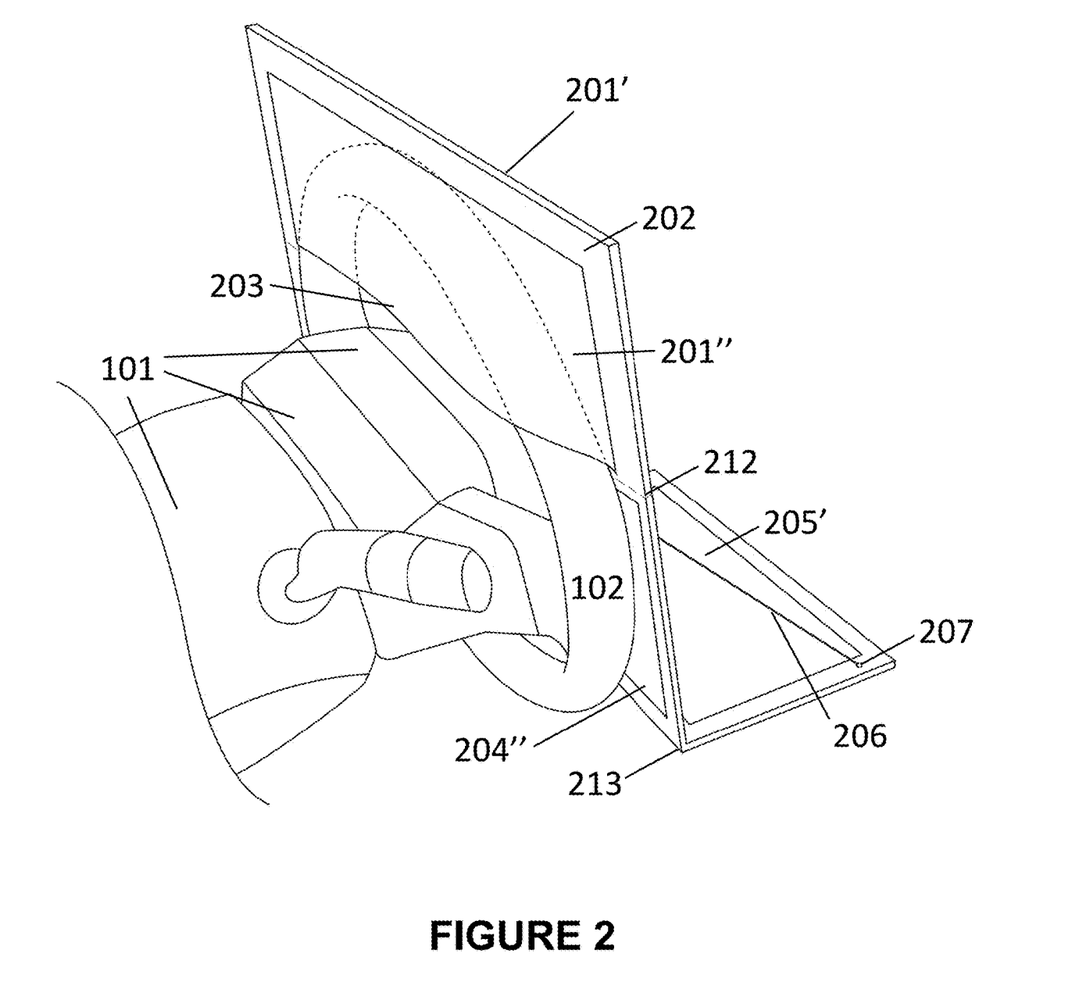
FIG. 2 is a view of tray1 secured to the steering wheel
Figure 3:
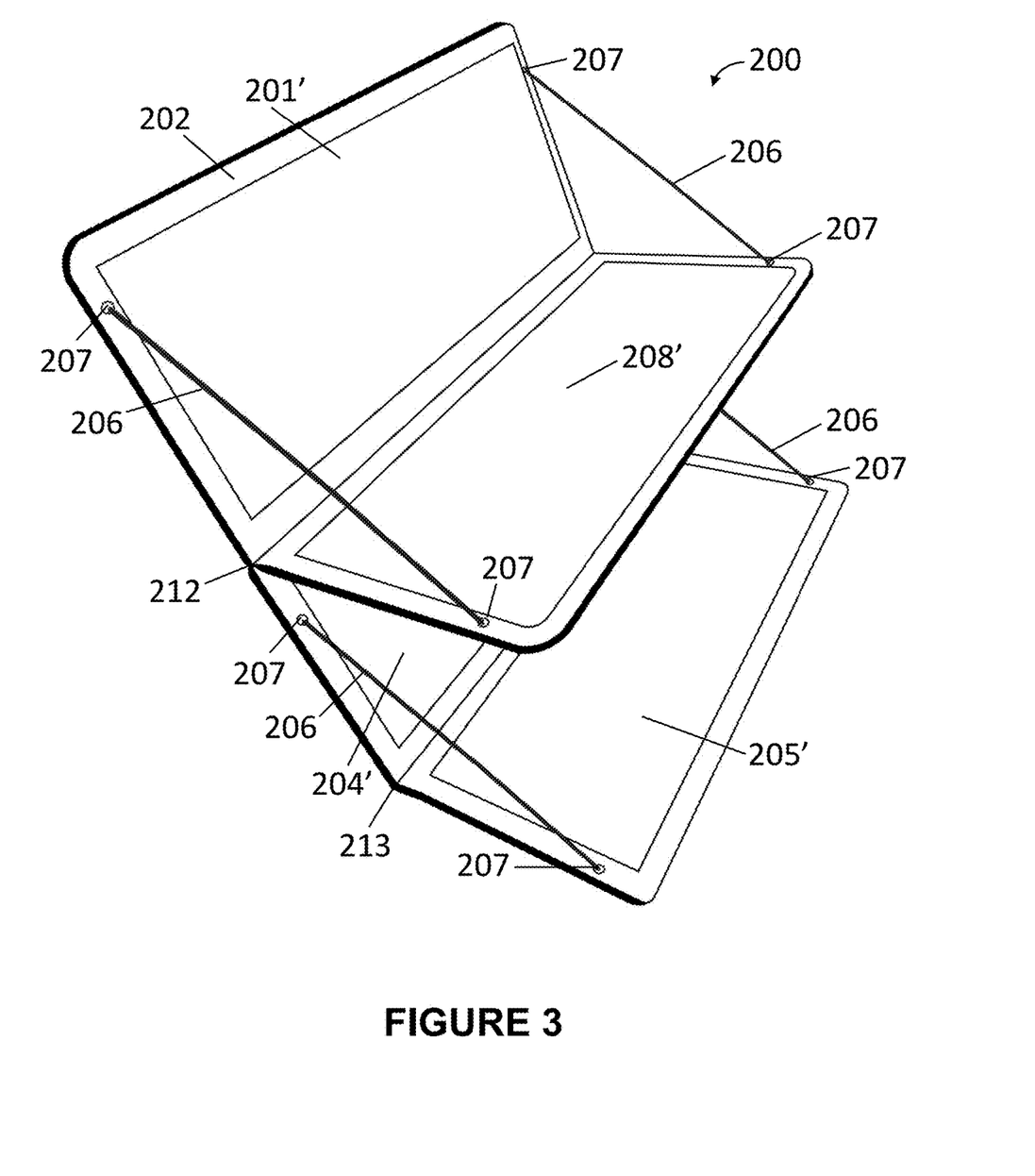
FIG. 3 is an overhead view of tray1

Elastic cloth/band/strap, netting, or cloth/nylon material is glued, stapled, or otherwise connected to the back of topmost panel (201") to form a "universal fit" securement pocket (203) that slides on/over the steering wheel (102) to support tray1 (200), as illustrated in FIGS. 1 and 2. This method makes the tray1 (200) simple and easy to use on most modern steering wheels. Alternative attachments could be made with clips or press fit clips, fold-out hooks, fabric sling, molded plastic (shaped like a steering wheel) or with VELCRO® brand fasteners, although these methods would be more inconvenient and time consuming than the preferred elastic securement pouch (203) attachment embodiment.

Vinyl sheeting, whiteboard material, and paint/stain can cover/seal all or part of tray1 (200) to form a non-porous, easy-to-clean, waterproof, smooth, colored surface. Additionally, if the backboard panels (201, 204) and shelves (205, optionally 208) are made of plastic, no paint/stain or covering is necessarily required but maybe used to change color or add a whiteboard option. The whiteboard option can cover one or more of the front surfaces of the backboard (201', 204') and shelves (205', 208') to allow for erasable notetaking.

The 15" horizontal edges of the backboard (201, 204) and shelves (205, optionally 208) are connected with "book tape" or any durable tape, cloth, plastic, rubber, silicon, vinyl, piano hinges, or accordion hinges; regardless of method (tape, vinyl, piano hinge, etc.), the element that joins one panel to another is called a "hinge" in this disclosure. Hinge (212) joins the backboard panels (201, 204) and optionally, the upper shelf panel (208) as clearly shown in FIGS. 2-7. Hinge (213) joins the lowest-most backboard panel (204) and lower shelf (205) as clearly shown in FIGS. 2-7. A panel-to-panel gap of at least ½" between the panels is preferred prior to attaching hinges (212, 213) to create the necessary clearance that enables 360° range of motion and allow the panels to fold-up (when unit is not in use). This is the same way a "book" opens and closes. The preferred hinging method is book tape (202) or equivalent.

Furthermore, each panel (201, 204, 205, optionally 208) are taped (202) on both sides and the part of the tape that covers each said ½" panel-to-panel gap forms a one-piece hinge (212, 213) at the corresponding panel-to-panel junction. Alternatively, vinyl sheeting, thin plastic, or other flexible material could layer all the panels (201, 204, 205, optionally 208) and said panel-to-panel gaps on both sides so that hinges (212, 213) are naturally created. Next, book tape (202), rubber, edge trim, vinyl, plastic, or equivalent material wraps and finishes off the perimeter of the entire unit, as shown in FIGS. 1-7.

FIG. 1 shows tray1 (200) in two-shelf-level form, where the upper shelf level is provided by panel (208) and lower shelf level is provided by panel (205). The upper shelf panel (208) is hinged at the same hinge (212) junction between panel (201) and panel (204). FIG. 2 is similar to FIG. 1 except panel (208) is shown to be partially folded about the hinge (212) to show the underside surface (208") along with the VELCRO® brand "hook" (209) and "loop" (209') fasteners to be described later. Tray1 (200) can also have a single level variant, which simply does not have panel (208) along with the associated cords (206), pre-drilled cord holes (207), and VELCRO® brand fasteners (209, 209').

Figure 4:
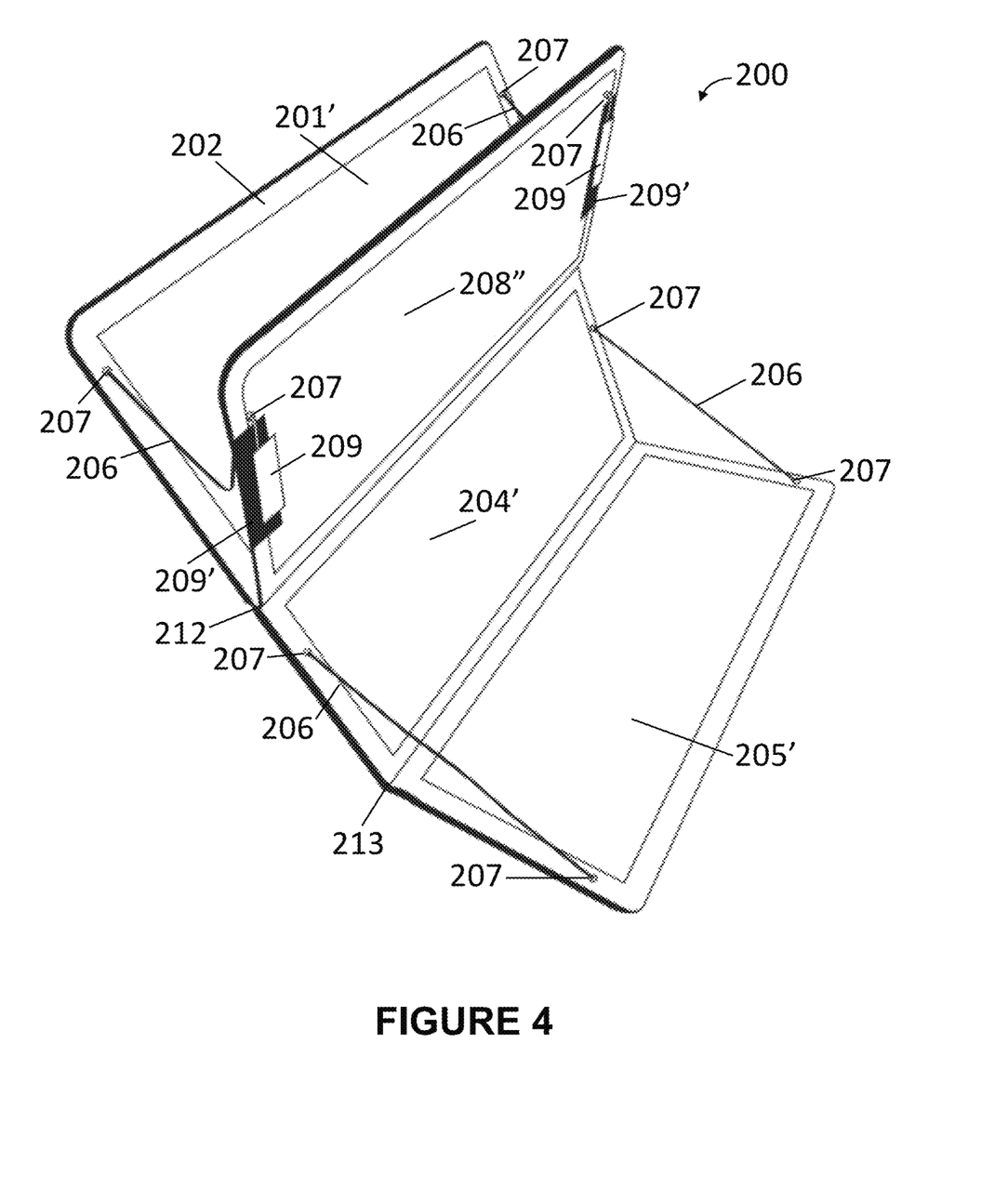
FIG. 4 is an overhead view of tray1 with the upper shelf partially folded
Figure 5:
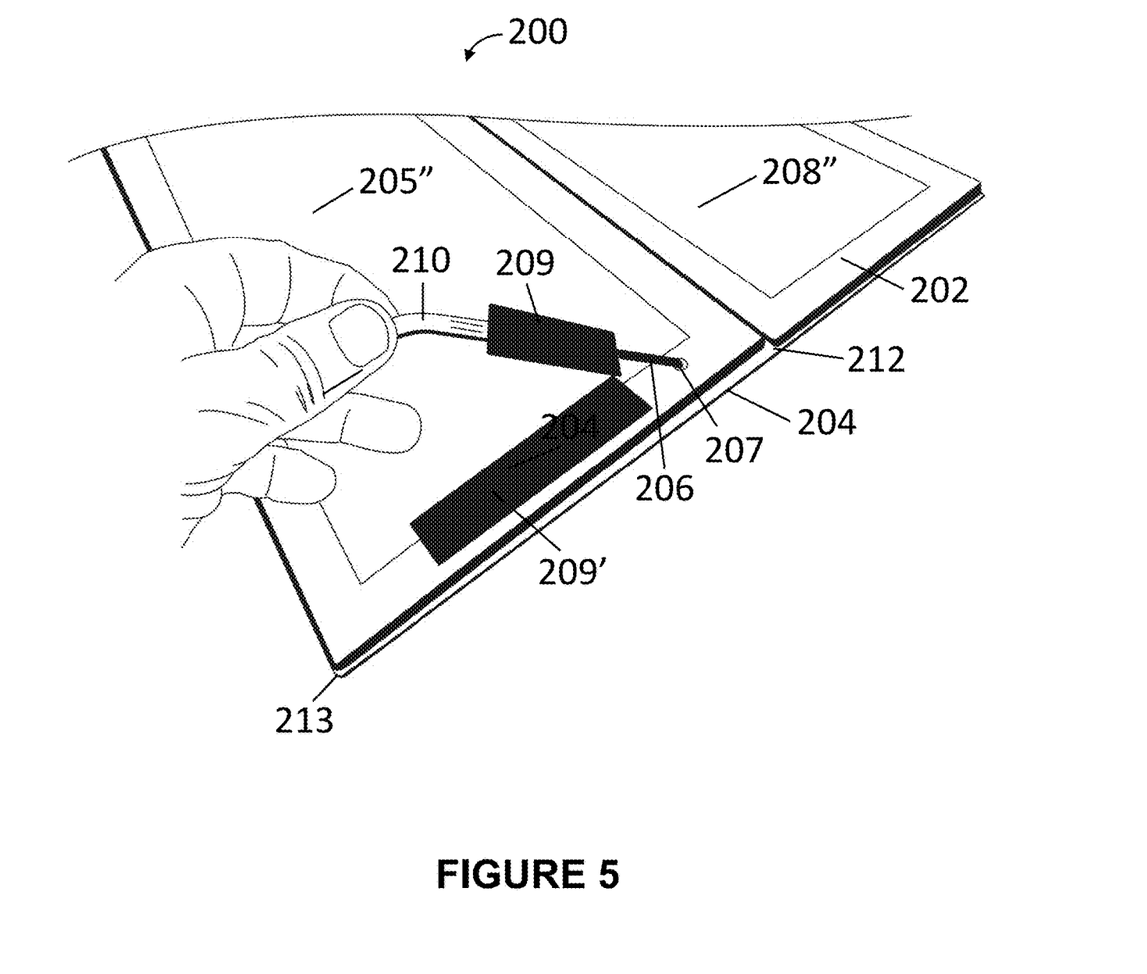
FIG. 5 shows a pair of VELCRO® brand fasteners on tray1 that secure the suspension cord

Cords or straps (206) disposed through pre-drilled holes (207) on two or more panels (201, 204, 205, optionally 208), is clearly shown in FIGS. 3-7. One end of each cord is stapled/glued to left and right sides of said top backboard panel (201", 204") with the other end of each cord extending to and disposed through the left or right holes (207) of the each shelf panel (205, optionally 208). As shown in FIGS. 4 and 5, the end of said cord/strap has a VELCRO® brand "hook" fastener (209) attached to it, with its mating VELCRO® brand "loop" fastener (209') attached to the corresponding bottom of the shelf(s) (205", optionally 208"). This cord and fastening assembly (206, 209, 209') creates the shelf suspension system for leveling/height adjustment. As only shown in FIG. 5, a small pull tab can be attached (210) to the open end of the VELCRO® brand "hook" fastener (209) to help the user pull on the cord (206). Alternatively, the cord (206) could loop around the shelf/shelves (205, optionally 208) and/or attach via notches, buttons, snaps, thin metal, or plastic straps/rods could also be used to support the shelves (205, optionally 208) from either the top (suspension) or the bottom (pillar). Staples, glue, thread, rivets, or plastic weld can be also used.

Figure 6:
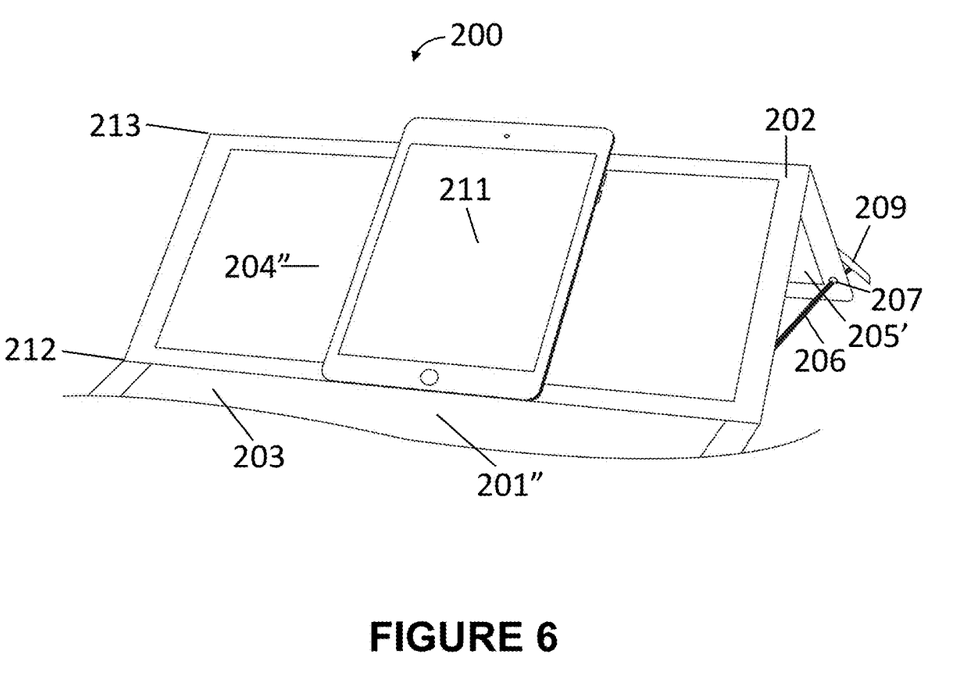
FIG. 6 is a view of tray1 functioning as an electronic device stand

ANCILLARY USES OF TRAY1 (Reference FIGS. 6-8): FIG. 6 shows tray1 (200) folded at hinge (212) and hinge (213) such that it forms a "V" shape with the open end of the "V" along the flat surface which the tray1 (200) rests. The back surfaces of tray1 (201", 204", 205") face away from the resting surface. FIG. 6 shows an electronic device, such as a "tablet" (211) placed on the back surface of panel (204") and edge of the back surface of panel (201").

Figure 7:
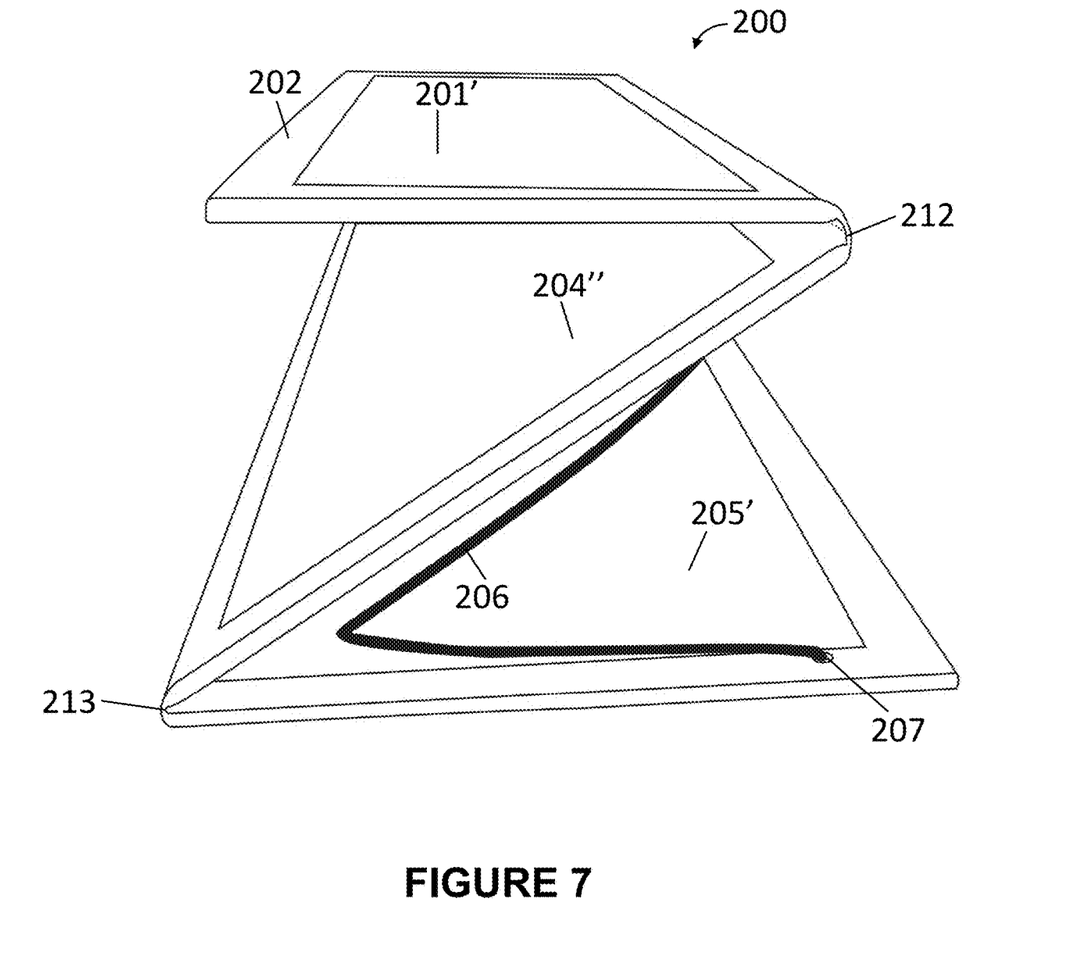
FIG. 7 is a side view illustrating the two-hinge "Z" fold design of tray1

FIG. 7 shows the mostly side profile of tray1 (200) in a semi-folded state. The key here is the alternating "Z" style folding about the hinges (212, 213) which allows the large surface area of tray1 (200) to be collapsible to a very compact form. The thickness of the tray1 (200) in fully folded state, when the top panel back surface (201") is folded flat on the middle panel back surface (204"), and the middle panel front surface (204') is folded flat on the bottom panel front surface (205') all simultaneously. In this state, tray1's (200) relatively thin form factor (range between approximately ¾ inches to 1.5 inches depending upon the number of shelves and baseboard material used) permits fitment between narrow areas of the vehicle, such as between the seat and center console or transmission driveline tunnel or door, yet is thick enough to prevent small objects from falling through and getting lost in the space occupied by the tray1 (200).

Figure 8:
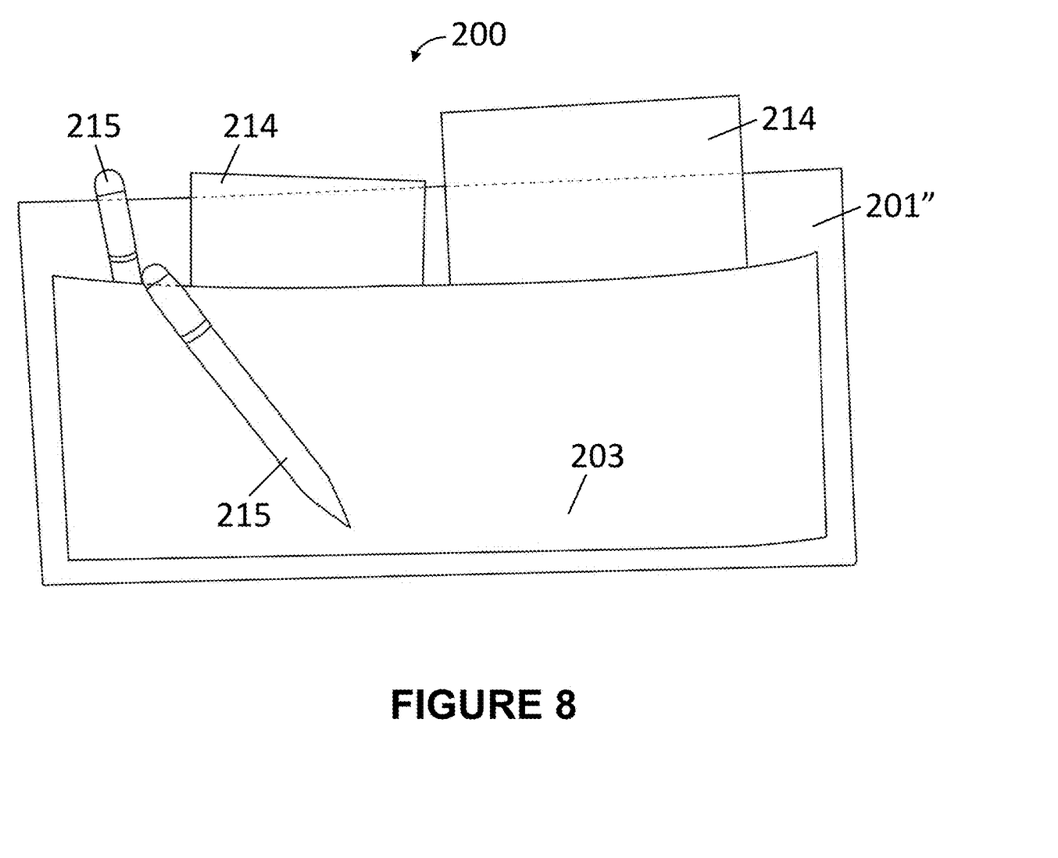
FIG. 8 shows tray1 used as a carrying case of small items

FIG. 8 shows the plan view of the tray assembly (200) if the pouch (203) side is deemed as the top surface. Small articles such as books (215) and pens (216) can be carried as shown to show the tray assembly (200) functioning as a carrying case.

Figure 11:
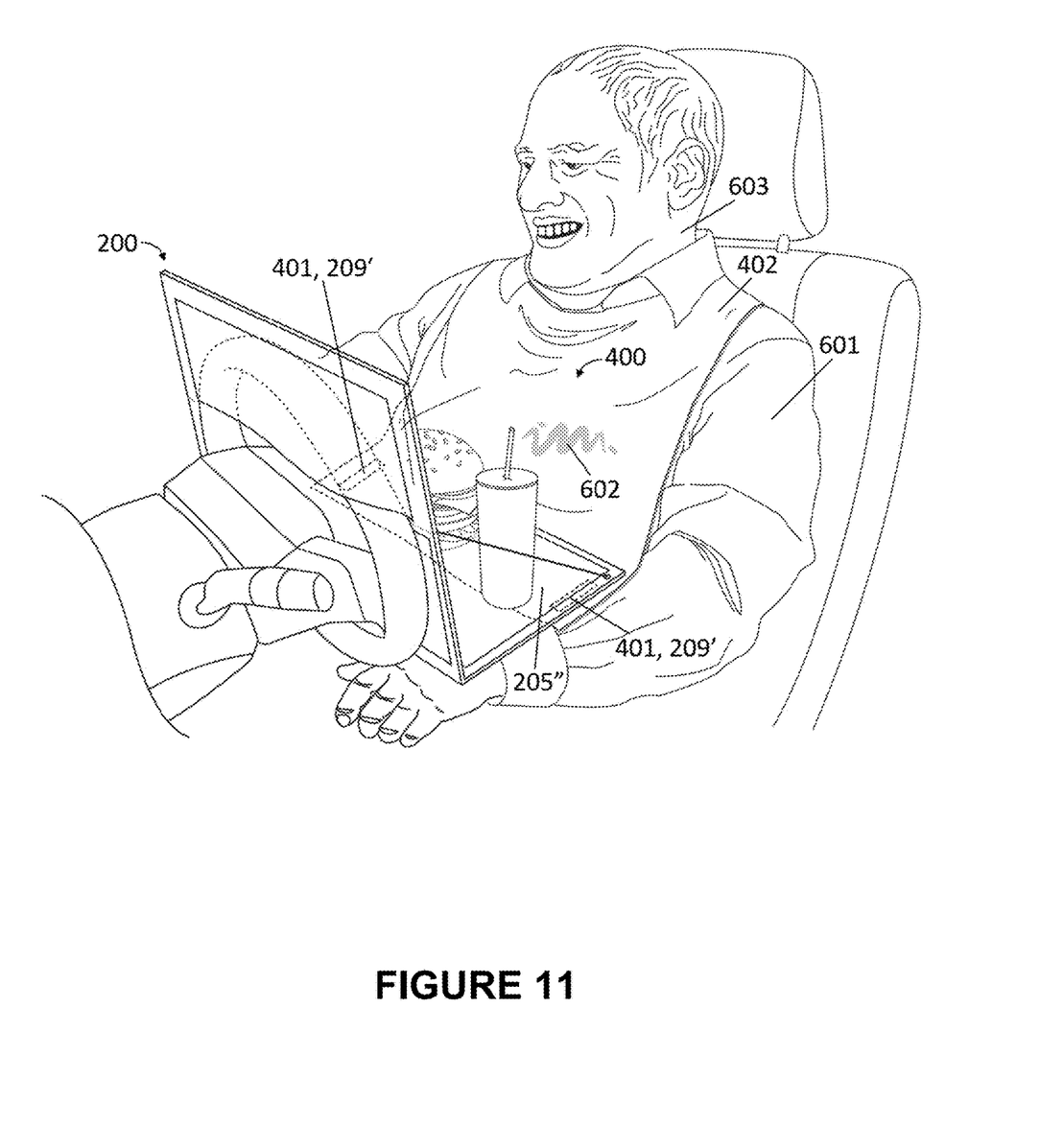
FIG. 11 is a view of a bib anchored to tray1 and a user seated on a vehicle seat

An optional bib, as shown in FIG. 11, can be attached to tray1 (200). When tray1 (200) is opened, a washable cloth or waterproof nylon bib (400) can have VELCRO® brand "hook" fasteners (401) attached at one edge of the bib connect to the VELCRO® brand "loop" (209') fasteners on the bottom surface of any of the shelves (205", optionally 208"). The bib (400) drapes over and shields the user's apparel (601) from food or objects (602) falling from above the bib. The edge of the bib opposite to the edge connected to tray1 (200) can connect to the user by way of an over-neck-like-leash (402) that links the bib (400) to the user's neck (603) or attaches to a collar around the user's neck. This bib (400) can neatly fold into tray1 (200) when the tray1 (200) is closed.

A fully or partially folded tray1 (200) can also be placed on the user's lap to be used as a "lap tray." Tray1 (200) when folded has the combination of lightweight and dimensions to be potentially used as a sun visor extension when the vehicle is parked. These uses are not directly illustrated in any of the figures.

CONSTRUCTION OF TRAY2 (Reference FIGS. 9-10): Much of the other existing steering wheel trays cater to the type of steering wheel (102) where the circular plane is substantially vertical or whose steering column axis (101) is less to substantially less than 60° relative to the vehicle's floorboard. However, for vehicles like many heavy-duty commercial trucks, buses, and some vans where the driver sits nearly over or ahead of the steered tires, such a tray would not be mountable nor functional even if mountable because the tray surfaces would be substantially tilted.

Figure 9:
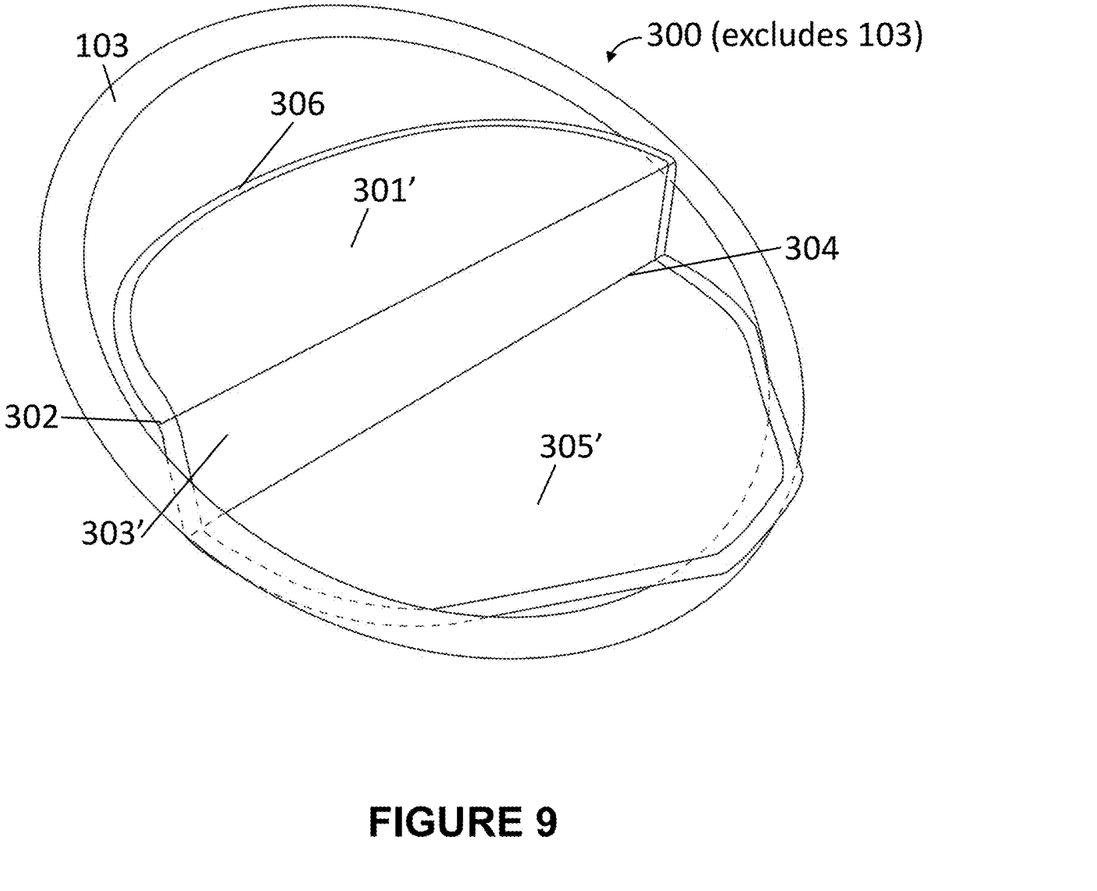
FIG. 9 is an overhead view of an alternative embodiment (tray2) for substantially horizontal steering wheels
Figure 10:
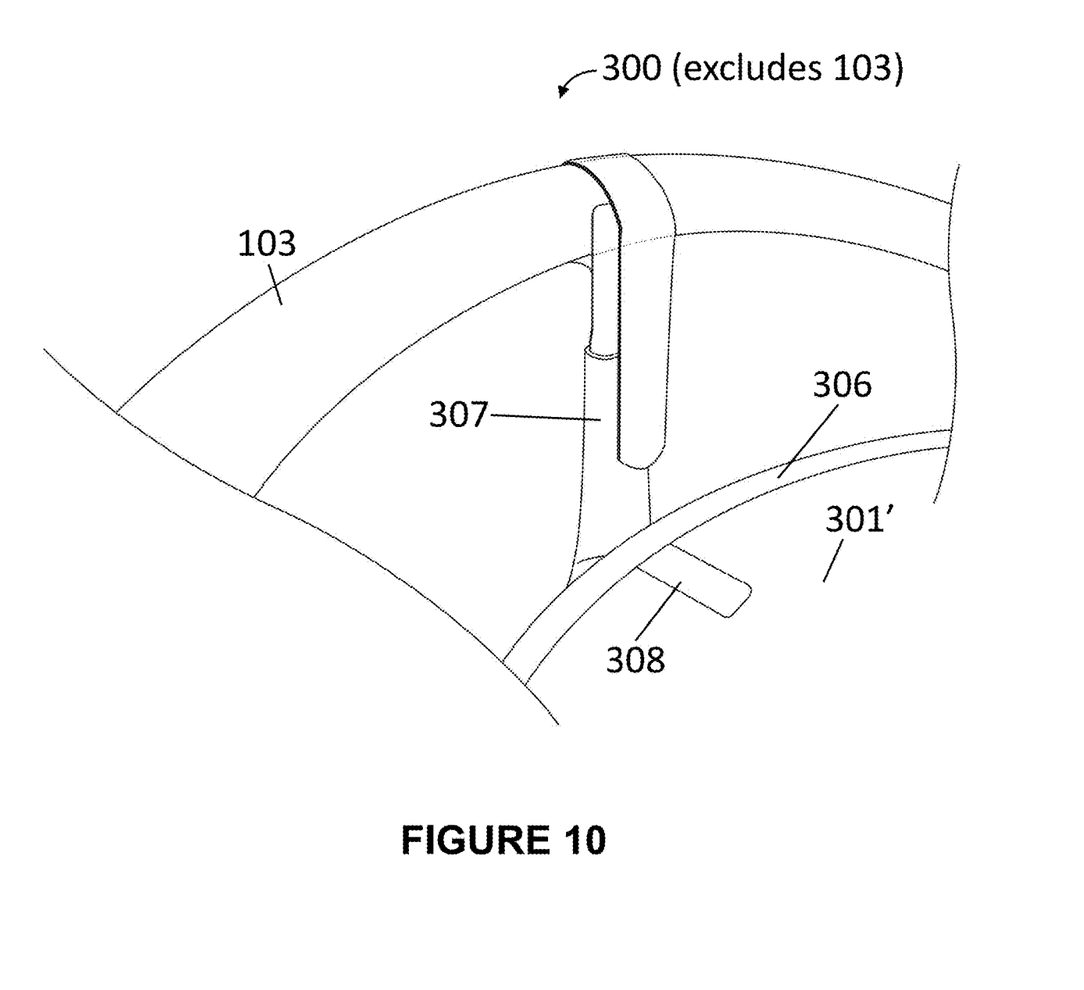
FIG. 10 is an overhead view of tray2 attached to a steering wheel using a novel securement strap

This scenario necessitates a different approach, and the present invention discloses an alternative embodiment for such applications, called tray2 (300) in this disclosure. FIGS. 9-10 show this alternative embodiment and is made of elements/parts (301-308).

All the materials and recommendations to make the boards, surface covers, and hinges of tray2 (300) can be the same ones indicated in the disclosure of the earlier mentioned tray1 (200). Tray2 panels (301, 303, 305), when mounted on the steering wheel (103), has a similar but slightly smaller overall diameter than the inner diameter of the steering wheel (103), allowing it drop/press in place. The substantially horizontal upper level panel (301) closest to the 12 o'clock position of the steering wheel is hinged (302) as shown in FIG. 9. The same hinge (302) is connected to one end of the substantially vertical panel (303) as shown in FIG. 9. Panel (303) is hinged (304) at the other edge as shown in FIG. 9. The same hinge (304) is shared with the substantially horizontal lower level panel (305) closest to the 6 o'clock position of the steering wheel.

Without straps, tray2 can be secured to said steering wheel (103) by placing tray2 within the inner diameter of said steering wheel (103) and more closely to the 6 o'clock position of said steering wheel (103) than to the 12 o'clock position as shown in FIG. 9, with the near edge portions of the panel surface (305') tucked under the steering wheel (103) near the 8 o'clock and 4 o'clock portion of the steering wheel (103). At the same time, tray2's panel (305) can be shaped with a small tongue-like extension that rides on top of the steering wheel (103) near the 6 o'clock position. This below-above-below style of steering wheel (103) securement will cause panel (305) to deflect some to create an interference fit between tray2 (300) and the steering wheel (103) to keep tray2 (300) from easily sliding around.

The radial periphery of the surface (306) has a stitched bezel throughout the entire circumference of the tray (300). The bezel (306) can alternatively be press sealed or melded plastic, taped, or press fitted with edging material. FIG. 9 shows a securement embodiment without support straps since the steering wheel (103) itself is the horizontal support for the tray (300).

FIG. 10 shows a supplemental securement embodiment comprising of a novel strap with a VELCRO® brand fastener (307). The strap (307) with a VELCRO® brand fastener (not shown) holds the upper level panel (301) of the tray2 (300) horizontal (closest to the dashboard) and is adjustable for height because of the length VELCRO® brand fastener along the strap (307) is long enough to offer adjustability. The strap (307) with a VELCRO® brand fastener is rigid since it has an approximately 1 inch×3 inch strip of the "backing board" (same as that used on the shelves) sandwiched between the "hook and loop" parts of the VELCRO® brand fastener. This unique feature allows vertical height adjustment but not much lateral movement since the internal board adds strength and stability. To further clarify, if the presented embodiment has 1 inch wide by 5-inch-long strap (307) with a VELCRO® brand fastener, the bottom three or four inches is not flexible, but the remaining portion is. The rigid part of the strap (307) with a VELCRO® brand fastener is aligned vertically so said strap engages the bottom side of said steering wheel (103) and is held in place by the VELCRO® brand fastener. The strap (307) loops over the 12 o'clock portion of the steering wheel (103) to lock the tray (300) in place. One end of the strap (307) is stitched to the portion of the upper level panel (301), but the method of attachment need not be limited to stitching.

Many alterations and modifications may be made by those having ordinary skill in the art without departing from the spirit and scope of the embodiments. Therefore, it must be understood that the illustrated embodiments have been set forth only for the purposes of example and that it should not be taken as limiting the embodiments.

The words used in this specification to describe various embodiments are to be understood not only in the sense of their commonly defined meanings, but to include by special definition in this specification structure, material or acts beyond the scope of the commonly defined meanings.

VELCRO® is a registered trademark of Velcro BVBA.

What is claimed is:

1. A system for a tray that is mountable to a steering wheel attached to a steering column above a vehicle's floorboard, said system comprising:
 a backboard comprising an upper panel and a lower panel;
 wherein each of said backboard panels has two sides, a backside that faces said steering wheel and a front side that faces outward from said steering wheel, when in use;
 wherein each of said backboard panels comprises a top edge, a right edge, a bottom edge, and a left edge in clockwise order when viewing the front side of each of said backboard panels;
 wherein a lateral position along each of said backboard panels is a point between the right edge and the left edge of each of said backboard panels;
 wherein said top edge of each of said backboard panels comprises a point that is furthest from said vehicle floorboard within each of said backboard panels, when in use;
 wherein said bottom edge of said upper panel is adjoined to the top edge of said lower panel by a backboard hinge;
 said system further comprising a lower shelf extending from the front side and the bottom edge of said lower backboard;
 wherein said lower shelf further comprises a back edge having a first endpoint and a second endpoint;
 said lower shelf further comprises a front edge having a first endpoint and a second endpoint;
 said lower shelf further comprises a first side edge connected to the first endpoint of the back edge of said lower shelf and the first endpoint of the front edge of said lower shelf;
 said lower shelf further comprises a second side edge connected to the second endpoint of the back edge of said lower shelf and the second endpoint of the front edge of said lower shelf;
 wherein a lateral position along said lower shelf is a point between the first side edge and the second side edge of said lower shelf;
 wherein the back edge of said lower shelf is adjoined to the bottom edge of said lower panel by a lower shelf hinge;
 wherein said lower shelf comprises an upper side and an underside;
 wherein said lower shelf is foldable about the lower shelf hinge so that the upper side of said lower shelf faces the front side of said lower panel;
 said system further comprises a pair of cords ("lower shelf cords") to suspend the lower shelf;
 wherein each of said lower shelf cords has an upper endpoint and a lower endpoint;

said lower panel further comprising a pair of holes each on opposite distal lateral positions of said lower panel and placed below the backboard hinge;

said lower shelf further comprising a pair of holes each on opposite distal lateral positions of said lower shelf;

wherein:

the upper endpoint of each of said lower shelf cords is disposed through each of said holes of said lower panel and attached to the backside of said lower panel;

the lower endpoint of each of said lower shelf cords is disposed through each of said holes of said lower shelf;

wherein a first portion of a first hook and loop fastener is placed on the underside of the lower shelf;

a second portion of said first hook and loop fastener is attached to the lower endpoint of each of said lower shelf cords;

the first portion of said first hook and loop fastener is longer than the second portion of said first hook and loop fastener to allow a shelf angle adjustability function of said lower shelf and further ability to retain a portion of a separate lower shelf attachment comprising a third portion of said first hook and loop fastener that is removably attached to the first portion of said first hook and loop fastener.

2. The system of claim 1, said system further comprising:

an upper shelf extending from the front side and the bottom edge of said upper panel;

wherein said upper shelf further comprises a back edge having a first endpoint and a second endpoint;

said upper shelf further comprises a front edge having a first endpoint and a second endpoint;

said upper shelf further comprises a first side edge connected to the first endpoint of the back edge of said upper shelf and the first endpoint of the front edge of said upper shelf;

said upper shelf further comprises a second side edge connected to the second endpoint of the back edge of said upper shelf and the second endpoint of the front edge of said upper shelf;

wherein a lateral position along said upper shelf is a point between the first side edge and the second side edge of said upper shelf;

wherein the back edge of said upper shelf is adjoined to the bottom edge of said upper panel by an upper shelf hinge;

wherein said upper shelf comprises an upper side and an underside;

wherein said upper shelf is foldable about the upper shelf hinge so that the upper side of said upper shelf faces the front side of said upper panel;

said system further comprises a second pair of cords ("upper shelf cords") to suspend the upper shelf;

wherein each of said upper shelf cords has an upper endpoint and a lower endpoint;

said upper panel further comprising a pair of holes each on opposite distal lateral positions of said upper panel;

said upper shelf further comprising a pair of holes each on opposite distal lateral positions of said upper shelf;

wherein:

the upper endpoint of each of said upper shelf cords is disposed through each of said holes of said upper panel and attached to the backside of said upper panel;

the lower endpoint of each of said upper shelf cords is disposed through each of said holes of said upper shelf;

a first portion of a second hook and loop fastener ("upper shelf H/L fastener") is placed on the underside of the upper shelf;

a second portion of said upper shelf H/L fastener is attached to the lower endpoint of each of said upper shelf cords;

the first portion of said upper shelf H/L fastener is longer than the second portion of said upper shelf H/L fastener to allow a shelf angle adjustability function of said upper shelf and further ability to retain a portion of a separate upper shelf attachment comprising a third portion of said upper shelf H/L fastener that is removably attached to the first portion of said upper shelf H/L fastener.

3. The system as recited in claim 2, wherein the second portion of each said upper shelf H/L fastener is removably attached to one of a plurality of locations along the first portion of each said upper shelf H/L fastener.

4. The system as recited in claim 2, wherein said upper shelf attachment is a bib.

5. The system of claim 1:

wherein the upper panel further comprises a securing pouch coupled to the backside of said upper panel along a portion of an outer perimeter of said securing pouch;

wherein a remaining uncoupled portion of said outer perimeter of said securing pouch is an open end of said securing pouch;

said securing pouch is capable of wrapping around, conforming, and gripping an upper portion of said steering wheel.

6. The system as recited in claim 1, wherein the second portion of each said first hook and loop fastener is removably attached to one of a plurality of locations along the first portion of each said first hook and loop fastener.

7. The system as recited in claim 1, wherein said lower shelf attachment is a bib.

8. The system as recited in claim 1, wherein:

the backboard hinge is configured to allow a 360° angular range-of-rotation of said upper panel relative to said lower panel;

the lower shelf hinge is configured to allow a 360° angular range-of-rotation of said lower shelf relative to said lower panel;

said backboard panels and said lower shelf are configurable to form a "V" structure capable of serving as a stand to place objects.

9. The system as recited in claim 8:

wherein said backboard panels and said lower shelf are foldable in an alternating "Z" fashion to collapse said system into a more compact form;

said securing pouch capable of retaining objects.

* * * * *